United States Patent [19]

Murray et al.

[11] 4,124,018
[45] Nov. 7, 1978

[54] SOLAR HEAT COLLECTING, STORING AND UTILIZING APPARATUS

[75] Inventors: Orin L. Murray, Florissant; Edwin P. Kriegesmann, Dittmer, both of Mo.

[73] Assignee: Barry-Wehmiller Company, St. Louis, Mo.

[21] Appl. No.: 732,328

[22] Filed: Oct. 14, 1976

[51] Int. Cl.² ............................ F24J 3/02; F24H 7/02
[52] U.S. Cl. .................................... 126/271; 126/400; 237/1 A
[58] Field of Search ..................... 126/270, 271, 400; 237/1 A

[56] References Cited

U.S. PATENT DOCUMENTS

| | | | |
|---|---|---|---|
| 2,484,127 | 10/1949 | Stelzer | 237/1 A |
| 2,705,948 | 4/1955 | Rostock | 126/271 |
| 3,394,446 | 7/1968 | Valyi | 228/118 |
| 3,400,249 | 9/1968 | Mekjean et al. | 126/400 X |
| 3,464,161 | 8/1969 | Andrassy | 126/400 X |
| 3,464,486 | 9/1969 | Rice et al. | 126/400 X |
| 3,957,030 | 5/1976 | Danis | 126/270 |
| 3,960,205 | 6/1976 | Laing | 126/270 |
| 3,980,071 | 9/1976 | Barber, Jr. | 237/1 A X |
| 4,029,258 | 6/1977 | Groth | 237/1 A |

Primary Examiner—William F. O'Dea
Assistant Examiner—Larry Jones
Attorney, Agent, or Firm—Gravely, Lieder & Woodruff

[57] ABSTRACT

Solar heat collecting, storing and utilizing apparatus which comprises a solar collector and a thermal capacitor in which the capacitor provides a means of dense storage of solar heat, at a temperature level within the selected range capable of being commerically or domestically utilized, and heat transfer means connected to the collector and capacitor and incorporating means for transferring the solar heat or the stored heat to a heat using device or process requiring heat.

8 Claims, 5 Drawing Figures

U.S. Patent    Nov. 7, 1978    Sheet 1 of 2    4,124,018
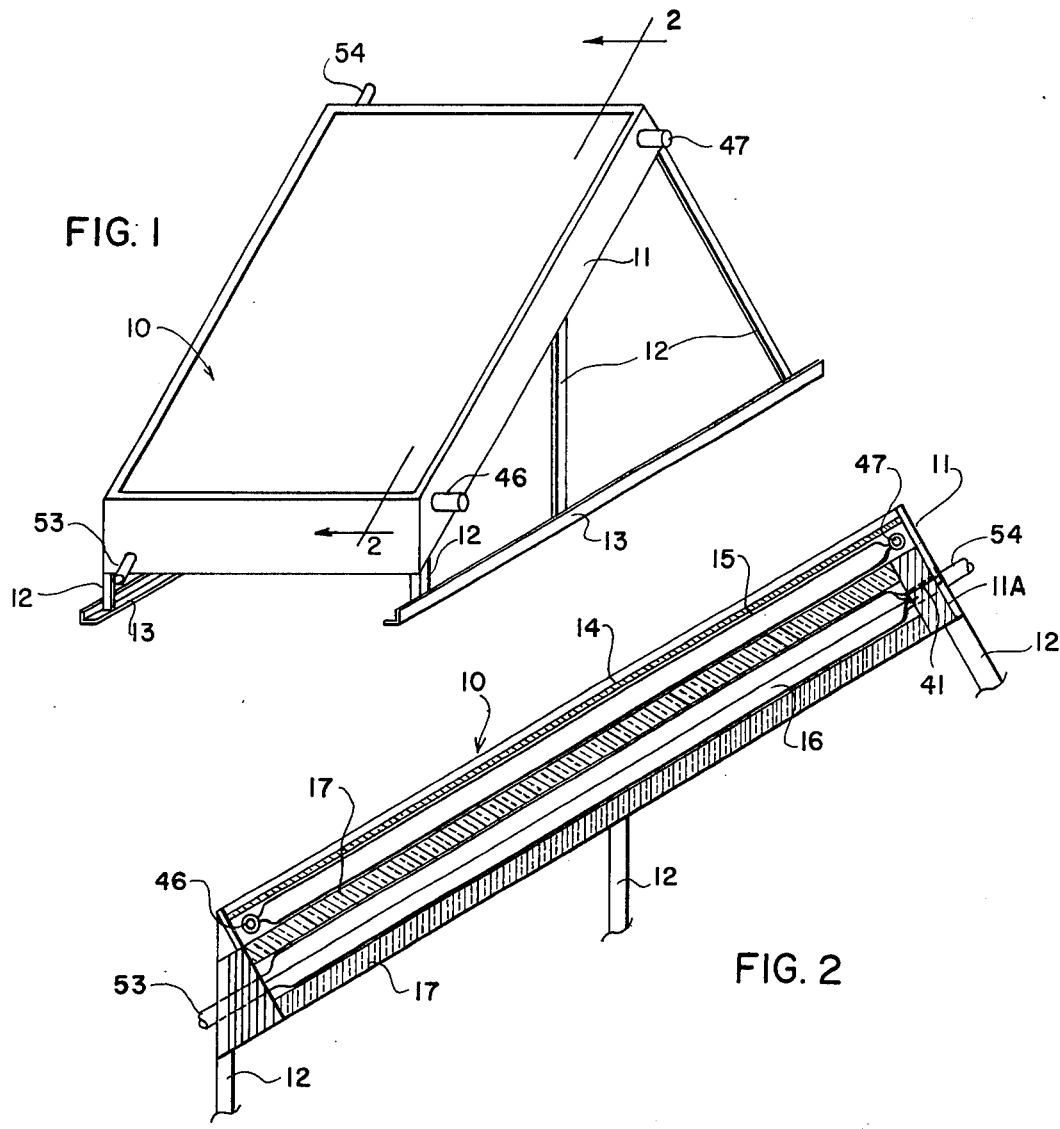
FIG. 1
FIG. 2
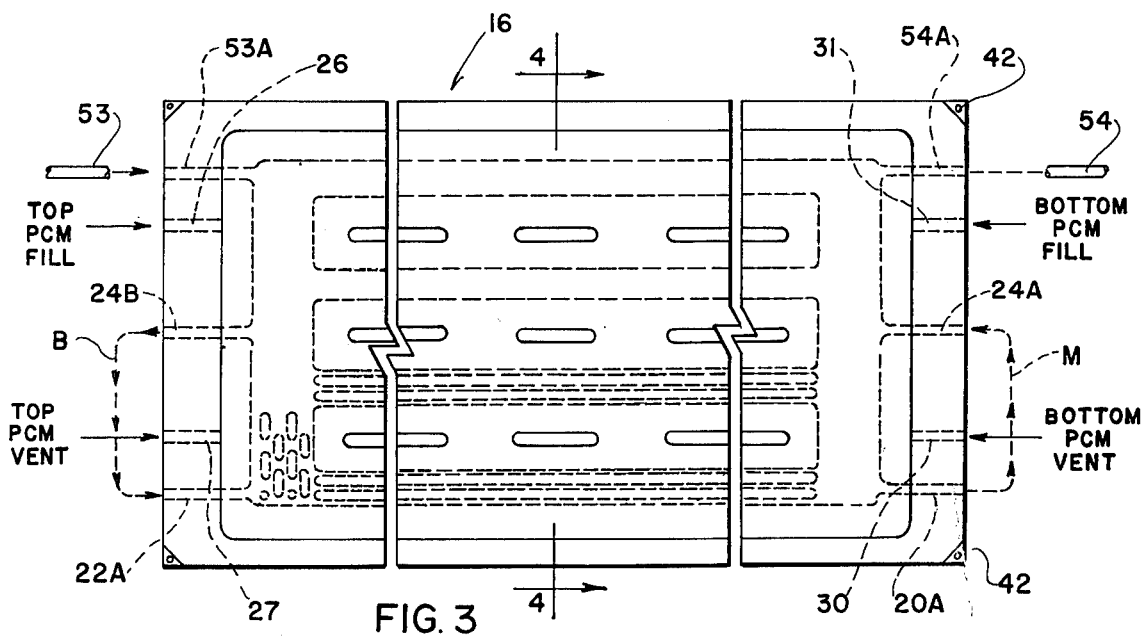
FIG. 3

SOLAR HEAT COLLECTING, STORING AND UTILIZING APPARATUS

BACKGROUND OF THE INVENTION

It is known that solar heat can be used to supply a wide spectrum of applications with heat at a temperature level that can be useful for a desirably long time period. Also, it is known that certain phase change materials can provide excellent heat storage media by using the heat of fusion of the material (PCM) to effect the heat absorption. This is accomplished by circulating hot fluid at a temperature above the melting temperature of the material (PCM) through a container which is charged with the material to store the heat, and then withdrawing the stored heat when needed by circulating a cool fluid at a temperature below the freezing temperature of the material (PCM).

BRIEF DESCRIPTION OF THE INVENTION

This invention pertains to solar heat collecting, storing and utilizing apparatus in which a solar heat collector is used to charge a heat storage capacitor which then can accommodate a heat load.

The important objects of the invention are to provide solar heat collector and heat storage systems, to provide a thermal capacitor which is an efficient device for dense energy storage, to provide a means for holding a phase change material in a closed space which has an efficient heat transfer surface, to provide a thermal capacitor having light weight but adequate strength to withstand the pressure differentials upon expansion and contraction of the phase change material (PCM), and to provide a fluid circulating system which can charge or discharge the thermal capacitor through an effective flow path in heat exchange relation with a solar collector unit.

A preferred embodiment of the present invention comprises apparatus in which a heat load is supplied with thermal energy by a fluid flow system connecting the heat load to a solar heat collector and heat storage capacitor employing a phase change material (PCM) where the collector and capacitor are selectively usable separately or jointly.

BRIEF DESCRIPTION OF THE DRAWINGS

The present invention is shown in a presently preferred embodiment of the accompanying drawings, wherein:

FIG. 1 is a perspective view of a combined solar heat collector and a heat storage capacitor;

FIG. 2 is an enlarged side view in sectional elevation of the apparatus seen in FIG. 1 the view being taken along line 2—2;

FIG. 3 is a plan view of a typical heat storage capacitor with portions shown in dotted outline to illustrate the details of its construction;

DETAILED DESCRIPTION OF THE APPARATUS

Figure 4:
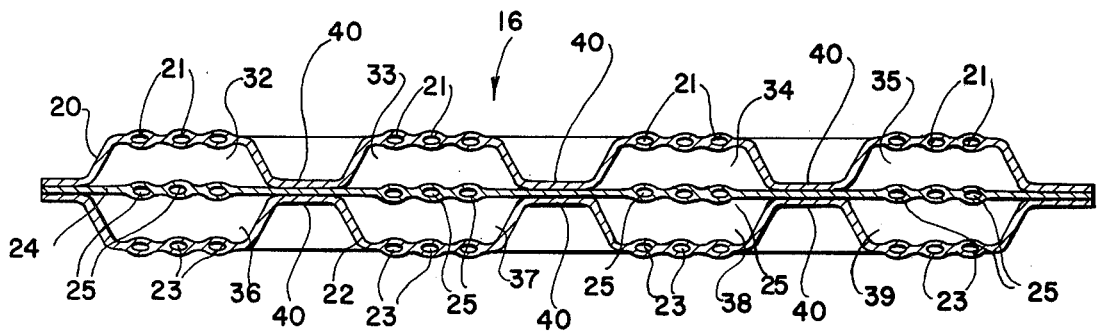
FIG. 4 is an enlarged sectional view of the capacitor taken along line 4—4 in FIG. 3.

In FIGS. 1 and 2 there is seen a preferred assembly consisting of a solar heat collector 10 mounted in a suitable frame or common enclosure 11 and supported on a plurality of legs 12 extending at various lengths between base rails 13 and the enclosure 11 so that the collector face will be at the desired angle to the path of travel of the sun rays. The collector 10 may be any one of a number of available collectors which has a glass face 14 that is exposed to the sun and is placed over a fluid carrying heat collector which is a sheet metal expanded tube fluid carrying collector unit 15. Solar heat is transmitted by the glass face to provide a substantially uniform distribution into the fluid carrying collector unit 15. The supporting enclosure 11 also carries a dense heat energy storage capacitor unit 16 which is connected in fluid flow relation with the collector unit 15. The capacitor 16 is embedded in suitable insulation 17 placed at the top and bottom and around the sides to retain the heat.

FIGS. 3 and 4 disclose a preferred construction for the capacitor 16 which is composed of a plurality of sheets (six sheets in this case) having certain areas masked off so that after diffusion-roll bonding of all of the sheets, subsequent controlled pressurization between the sheets will expand the sheets in the areas where maskant was applied. The manufacture of the unit 16 follows somewhat the disclosure in Olin Mathieson U.S. Pat. No. 3,394,446. As a result the top pair of sheets (FIG. 4) 20 will be expanded to form a plurality of tubular passages 21. The bottom pair of sheets 22 will also be expanded to form a plurality of tubular passages 23. The middle pair of sheets 24 will also be expanded to form a plurality of tubular passages 25. In order to form the capacitor 16 the top pair of sheets 20 will be pressurized away from the middle sheets 24 at the ports 26 and 27, and the bottom pair of sheets 22 will be pressurized away from the middle sheets 24 at ports 30 and 31. In this manner the top and bottom pairs of sheets 20 and 22 will be expanded away from the middle pair of sheets 24 to form spaces 32, 33, 34 and 35 at the top and spaces 36, 37, 38 and 39 at the bottom.

In constructing the capacitor 16, ports 26 and 30 open to the top and bottom spaces 32 to 35 and 36 to 39 respectively, and ports 27 and 31 open to the same spaces to allow for escape of air as a phase change material (PCM) is admitted while melted for flowability and to assure that the volume of the spaces is filled. The ports 26, 27, 30 and 31 are sealed immediately after the PCM is loaded. As the heat is dissipated the PCM solidifies and shrinks so that there is a tendency for the sheets to draw in, except that this tendency is prevented by forming stiffening wells 40 in both surfaces. Once the capacitor 16 is formed and charged with phase change material and sealed, it is ready to be installed in place beneath the solar heat collector 10 in a common enclosure 11. Insulation material 17 is placed around on all edges and on the top and bottom surfaces. Since the enclosure 11 is tilted it is necessary to provide hooks 41 which engage holes 42 in the upper corners of the capacitor 16 and hook over an adjacent part 11A of the enclosure 11. The phase change material may be any of those which are known to absorb heat to melt and to yield heat upon solidifying, such for example as organic wax.

Figure 5:
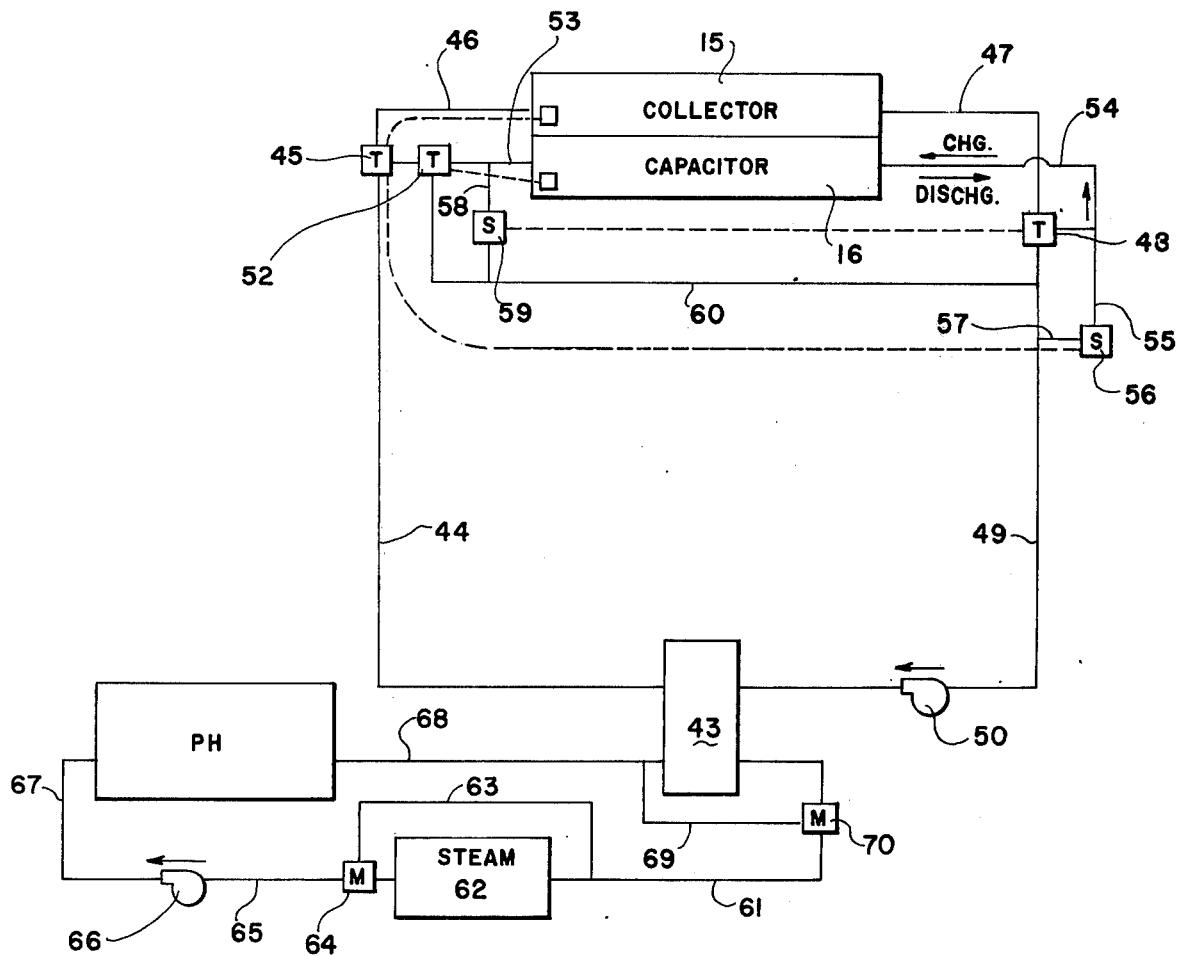
FIG. 5 is a schematic view of a heat exchange system embodying the solar collector and storage capacitor seen in FIGS. 1 to 4 inclusive.

Turning now to FIG. 5 it can be seen that the solar collector unit 15 and capacitor 16 are connected into a heat exchange system. It is only necessary for an understanding of this invention to show and describe an assembly of one solar heat collector and one capacity, as it is understood that a plurality of collectors and capacitors can be employed to supply heat to accommodate a desired heat load. In describing the system reference will be made to the other views of the drawings as needed. The system shown in FIG. 5 has several modes of operation which will be designated as collection/load support mode; collection/load support and charging mode; discharging mode; and conventional heat source mode.

The flow system seen in FIG. 5 includes a heat exchanger 43 connected through pipe 44, thermostatic valve 45 and pipe 46 to collector unit 15. The unit 15 has its outlet pipe 47 connected to a 2-position valve 48 to pipe 49 which connects into the suction of a pump 50. The pump delivery side is connected through pipe 51 to the exchanger 43. In addition, the valve 45 is connected through valve 52 and pipe 53 to the capacitor 16. The capacitor 16 is connected by pipe 54 to the 2-position thermostatic valve 48 or by pipe 55 to a slave valve 56 which is connected by pipe 57 to return pipe 49. The pipe 53 has a branch pipe connection 58 through a slave valve 59 to pipe 60 which connects into pipe 49. The heat delivered to exchanger 43 is transferred to a flow system in which pipe 61 runs either through a source of steam 62 or in by-pass at pipe 63 and valve 64 to pipe 65, pump 66 and pipe 67 to the process heat demand at PH. The return pipe 68 connects to the exchanger 43 or into by-pass 69 controlled by mixing valve 70 in pipe 61. The function of the several valves will be set forth in the following description.

The system shown in FIG. 5 has several modes of operation which are designated as collection/load support mode; collection/load support and charging mode; discharging mode; and conventional heat source mode. In the collection/load support mode the solar collector unit 15 is capable of providing sufficient heat to actively support the process heat load at PH through heat picked up at an exchanger 43, but is not capable of supplying sufficient excess heat to charge the thermal capacitor 16. In this mode valve 45 which senses a collector surface temperature equal to or greater than about 200° F., directs the heat transfer fluid circulated by pump 50 through pipe 46 and into the collector unit 15, and closes valve 56 to pipe 55. Valve 48 sensing fluid temperature in pipe 47 less than 185° F., directs the fluid flow through pipe 49 and pump 50 to the exchanger 43 where its heat is given up to the fluid moving in pipe 61 and 68 to by-pass pipe 63 around the conventional heat source 62 and through pump 66 to the process heat load PH. In the process heat circuit, the mixing valve 70 may be set to partially by-pass the fluid around the exchanger 43 through pipe 69 to produce a predetermined mixture temperature.

In the collection/load support and charging mode the solar collector unit 15 is capable of providing enough heat to actively support the process heat load PH and enough heat to charge the thermal capacitor 16. At this time, valve 45 senses a collector surface temperature equal to or greater than 200° and directs the heat transfer from pipe 44 through the collector unit 15, closes valve 56 to pipe 55. Valve 48 sensing fluid temperature in pipe 47 equal to or greater than 185° directs all of the fluid flow through pipe 54 and through the capacitor 16 to pipe 53 where the 2-position thermal valve 52 is closed and slave valve 59 is opened to direct the fluid flow through pipe 60 and into pipe 49 to supply the exchanger 43 with the heat not absorbed in the capacitor.

The discharging mode occurs when the solar collector unit 15 is incapable of providing heat, and the capacitor 16 is charged. In this mode valve 45, sensing a collector surface temperature less than 200° F., directs the fluid flow from pipe 44 through the valve 52 to pipe 53 and into the capacitor 16. This is possible since the thermostatic 2-position valve 52, sensing a thermal capacitor temperature equal to or greater than 160° F., opens pipe 53 to the capacitor 16 where the stored heat is retrieved and the heated fluid passes through pipe 54, pipe 55 and slave valve 56 into pipe 57 and return pipe 49. It is noted that the fluid flow through the capacitor 16 in the discharging mode is in the opposite direction to the flow when the solar collector unit 15 produces sufficient excess heat to carry the process load and also charge the capacitor 16.

The conventional heat source mode is provided in the event that the solar collector unit 15 and the capacitor 16 are both incapable of providing enough heat to support the process heat load PH. A thermal switch of conventional type in pump 50 power circuit, sensing a fluid temperature less than 150° F. in pipe 49 activates a timer that de-energizes pump 50 after a pre-selected period of time. Simultaneously mixing thermal valve 64 sensing a process fluid temperature less than 150° F., directs the fluid through the steam heat exchanger 62 which now supports the process heat load PH.

The fluid connections for the capacitor 16 (FIG. 3) are made as follows: pipe 53 is connected into passages 53A and pipe 54 is connected into passages 54A. These are the external connections associated with the flow system of FIG. 5. The fluid flow through the tubular passages 21 in the top sheets 20 exit at passage 20A. This flow is directed by a suitable connecting passage represented by the broken line M to passage 24A connected into the middle sheets 24 where the flow moved through tubular passages 25 to an outlet passage 24B. From passage 24B the flow is directed by a suitable connecting passage represented by the broken line B to passage 22A. The fluid flow through the several tubular passages 23 in the bottom sheet 22 to passage 54A which connects with the external pipe 54. It is to be understood that the fluid flow can be in either direction at external pipes 53 and 54 so that one acts as an outlet while the other acts as the inlet.

The foregoing system provides a unique arrangement in which the thermal capacitor is mounted directly adjacent the thermal collector thereby providing a very short flow path between these two units for more efficient heat transfer. Furthermore the compact arrangement of collector and capacitor avoids the necessity in an industrial production area of having to utilize an excessive amount of floor area in order to obtain the desired amount of thermal heat storage capacity. It has been pointed out above that the system disclosed in FIG. 5 may consist of a plurality of solar heat collector units, like unit 15 and each being provided with a heat storage capacitor capable of storing the heat energy collected during 8 hours of sunshine. For example in a solar time period from 6:00 AM to 6:00 PM, in certain areas where the sun shines during that time period, the solar collector can actively support the heat load of the process equipment 72 and during the peak period between 9:00 AM and 3:00 PM can charge the heat storage capacitor so that at a time when the sun is not shining the heat can be extracted from the capacitor thereby carrying the process load during the period when the sun is not capable of carrying the load.

In certain geographical areas where the ambient temperatures reach freezing or below, the heat transfer fluid is ethylene glycol or a similar anti-freeze to prevent damage due to freezing conditions.

What is claimed is:

1. In solar heat utilizing apparatus the combination comprising: first means to collect solar heat having fluid flow passages exposed to the sun; a heat exchanger; second means to store and discharge stored solar heat, said second means having a plurality of fluid flow passages in spaced layers and interleaved closed chambers; a piping system forming paths for fluid flow interconnecting said first means with said second means fluid flow passages and said heat exchanger; solar heat responsive phase change material in said closed chambers; a heat transfer fluid circulated in said piping system and isolated thereby from said closed chambers; and valve means disposed in said piping system selectively settable to direct said heat transfer fluid between said fluid flow passages in said first and second means and said heat exchanger in a predetermined path of said piping system.

2. The solar heat utilizing apparatus of claim 1 wherein said valve means are set to direct the heat transfer fluid between said fluid flow passages of said first means and said heat exchanger.

3. The solar heat utilizing apparatus of claim 1 wherein said valve means are set to direct the heat transfer fluid between said fluid flow passages in said first and second means in series, thence to said heat exchanger and back to said fluid flow passages of said first means.

4. The solar heat utilizing apparatus of claim 1 wherein said valve means are set to direct the heat transfer fluid between said fluid flow passages in said second means and said heat exchanger.

5. In solar heat utilizing apparatus the combination of: first means having an exposed face to collect solar heat; second means containing a latent heat phase change material selectively operable to store and give up stored heat; heat exchanger means to utilize solar heat; piping means to circulate a heat exchanger liquid between said first means and said second means and said first means and said heat exchanger means; and valve means in said piping means operable in response to temperature values in said first and second means to select the flow path for the heat exchange liquid, said valve means being responsive to temperature adjacent the exposed face at said first means of the order of 200° F. or more to select the flow path directly between said first means and said heat exchanger means, being responsive to heat exchange liquid temperature at the outlet of said first means of the order of 185° F. or more to select the flow path from said first means through said second means to store up solar heat and then to said heat exchanger, and being responsive to temperature adjacent the exposed face at said first means of the order of less than 200° F. to select the flow path directly between said second means and said heat exchanger.

6. In solar heat collecting, storing and utilizing apparatus, the combination of solar heat collector means exposed to the sun, heat exchanger means, liquid heat exchange medium, conduit means for connecting said collector means and heat exchanger means in a flow circuit for said liquid heat exchange medium, and latent phase change heat storage means connected into said flow circuit for said heat collector means and heat exchanger means for storing solar heat from said liquid medium in excess of about 185° F. and releasing such stored solar heat to said liquid medium for maintaining said heat exchange liquid medium at a temperature of about 185° F., and in which combination said latent phase change heat storage means comprises a panel body having a plurality of walls formed with internal passages for said liquid heat exchange medium, a plurality of closed spaces between said walls in heat exchange relation with said passages, and phase change material in said closed spaces subject to melting when in heat exchange levels at and above said 185° F. to store the heat and subject to solidifying when releasing stored heat at about 185° F.

7. The apparatus set forth in claim 6 wherein said solar heat collector and latent phase change heat storage means are panels mounted in a common frame, and said heat exchange means is disposed remotely from said common frame.

8. The apparatus set forth in claim 6 wherein said solar heat collector means and said latent phase change heat storage means are spaced apart, insulation means is disposed in the space between said collector means and storage means, and common means supports the collector means and storage means and insulation means in adjacent positions.

* * * * *